United States Patent [19]

Tasaka

[11] Patent Number: 5,131,827
[45] Date of Patent: Jul. 21, 1992

[54] FIBER- AND WHISKER-REINFORCED INJECTION MOLDABLE RESIN COMPOSITION FOR SCROLL COMPRESSOR PARTS AND METHOD OF MANUFACTURING SCROLL COMPRESSOR PARTS

[75] Inventor: Takio Tasaka, Tokushima, Japan

[73] Assignee: Otsuka Kagaku Kabushiki Kaisha, Osaka, Japan

[21] Appl. No.: 607,774

[22] Filed: Oct. 31, 1990

Related U.S. Application Data

[63] Continuation of Ser. No. 340,095, filed as PCT/JP88/00477, May 20, 1988, abandoned.

[30] Foreign Application Priority Data

May 29, 1987 [JP] Japan .................. 62-136518

[51] Int. Cl.$^5$ .................. F04D 7/02; B29C 45/03; C08J 5/10
[52] U.S. Cl. .................. 418/55.2; 264/275; 264/328.1; 264/328.18; 418/56; 524/75; 524/76; 524/404; 524/406; 524/592; 524/601; 524/606; 524/609
[58] Field of Search .................. 264/331.12, 331.16, 264/331.19, 328.18, 275, 328.1; 524/592, 601, 606, 609, 75, 76, 404, 406; 418/55.2, 56

[56] References Cited

U.S. PATENT DOCUMENTS

| | | | |
|---|---|---|---|
| 4,599,383 | 7/1986 | Satoji | 524/495 |
| 4,755,585 | 7/1988 | Hanson et al. | 524/600 |
| 4,760,109 | 7/1988 | Chiba | 524/606 |
| 4,772,422 | 9/1988 | Hijikata et al. | 524/601 |
| 4,777,204 | 10/1988 | Ikenaga et al. | 264/331.15 |

FOREIGN PATENT DOCUMENTS

| | | |
|---|---|---|
| 55-7848 | 1/1980 | Japan. |
| 55-21283 | 2/1980 | Japan. |
| 57-13586 | 3/1982 | Japan. |
| 58-127761 | 7/1983 | Japan. |
| 59-179656 | 10/1984 | Japan. |
| 59-179659 | 10/1984 | Japan. |
| 59-182842 | 10/1984 | Japan. |
| 60-228558 | 11/1985 | Japan. |
| 61-185566 | 8/1986 | Japan. |
| 61-190557 | 8/1986 | Japan. |
| 62-43459 | 2/1987 | Japan. |

*Primary Examiner*—James Lowe
*Attorney, Agent, or Firm*—Armstrong & Kubovcik

[57] ABSTRACT

This invention relates to a resin composition for scroll compressor parts which comprises
(A) about 40 to 70 parts by weight of at least one thermoplastic resin selected from the group consisting of polyphenylene sulfide, polyetheretherketone, polyetherketone, all-aromatic polyester, nylon-4,6, nylon-MXD6, polysulfone, polyarylsulfone, polyethersulfone, polyetherimide, polyamide-imide and polyimide,
(B) about 15 to 45 parts by weight of whisker with an average fiber diameter of not more than about 3 $\mu$m and a tensile modulus of not less than about 10,000 kgf/mm$^2$;
(C) about 10 to 25 parts by weight of heat-resistant fiber with an average fiber diameter of not more than about 30 $\mu$m and a tensile modulus of not less than about 6,500 kgf/mm$^2$; and
(D) about 5 to 20 parts by weight of a finely divided solid lubricant, the sum total of components (A) to (D) being 100 parts by weight and a method of manufacturing scroll compressor parts characterized in that the above composition is injection molded.

17 Claims, 1 Drawing Sheet

FIG.I
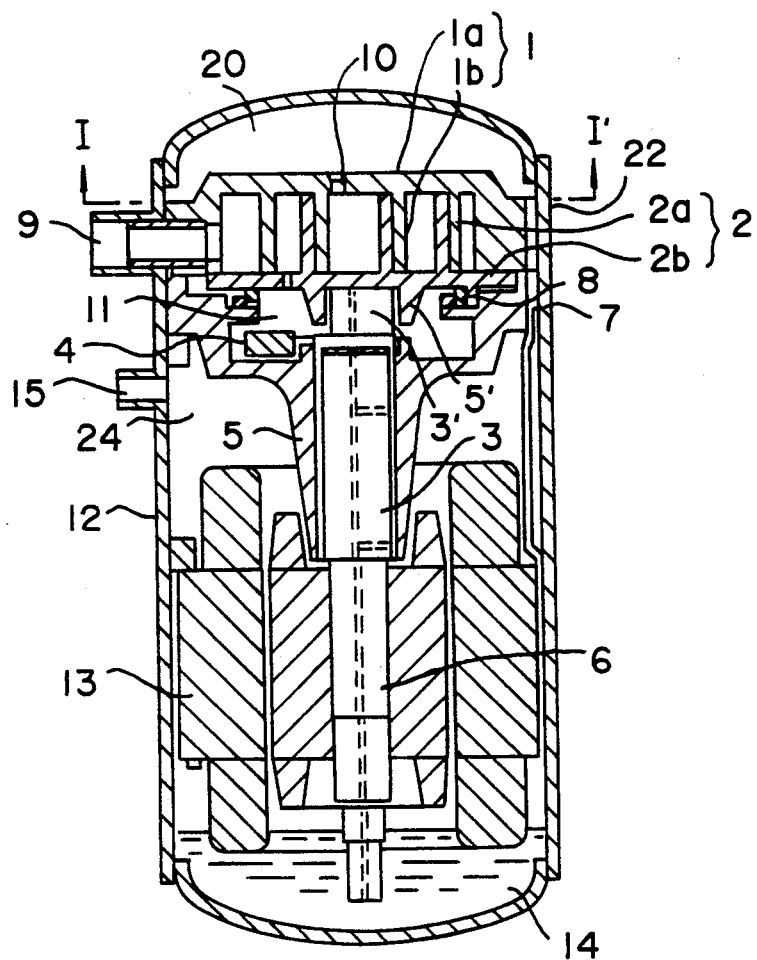
FIG.2
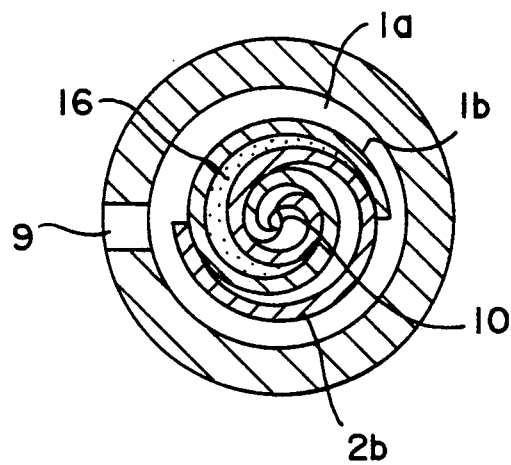

FIBER- AND WHISKER-REINFORCED INJECTION MOLDABLE RESIN COMPOSITION FOR SCROLL COMPRESSOR PARTS AND METHOD OF MANUFACTURING SCROLL COMPRESSOR PARTS

This application is a continuation of application Ser. No. 340,095, filed as PCT/JP88/00477, May 20, 1988 and now abandoned.

TECHNICAL FIELD

This invention relates to a resin composition for scroll compressor parts and a method of manufacturing scroll compressor parts. More particularly, this invention relates to a resin composition for manufacture of precision parts of the scroll compressor which is used as an air conditioner compressor, an air or gas compressor or the like and a method of manufacturing such parts.

BACKGROUND TECHNOLOGY

The scroll compressor comprises a fixed scroll and an orbiting scroll each equipped with a mirror plate member and an involute spiral member (called scroll lap) perpendicular to said mirror plate member, the respective laps being interleaved in such a manner that one is fixed with the other free to orbit without spinning about its own axis so as to cause a closed space defined by and between the scroll laps to be shifted and diminished in the direction from the outer circumference to the inner circumference to thereby compress a gas such as Freon gas.

Heretofore, all the fixed scroll and orbiting scroll of the scroll compressor and the drive shaft (called rotor shaft) for driving the orbiting scroll have been made of cast iron. However, the scroll laps, the mirror surface of the mirror plate member and the surface of the rotor shaft which demand a precision of the order of microns must be subjected to both rough grinding and finishing which are time-consuming and extremely poor in production efficiency. In addition, the tools are subject to wear and require a very complicated tool control for maintaining the required processing accuracy. Therefore, an attempt was made to use cast aluminum which is easier to process in lieu of cast iron. However, in this case, the large centrifugal force accompanying a high speed gyration causes a large deformation and there is also a constant risk of general destruction due to an impact caused by local contact, thus requiring sufficient oil lubrication not only from the standpoint of wear resistance but also for circumventing the above-mentioned risk. The need for oil lubrication means that there must be a mechanism for pumping the lubricating oil, which would add to the complexity of the structure, thus imposing limitations on the reduction of cost, size and weight of parts. Furthermore, the metal rotor shaft of cast iron or cast aluminum has the disadvantage that the transmission magnetic sound (i.e. noise) from the motor rotor is high and that it is of large weight.

SUMMARY OF THE INVENTION

It is an object of this invention to provide a resin composition from which precision parts for a scroll compressor can be manufactured by the high-production technique of injection molding, which parts are lightweight and of high rigidity, with good dimensional accuracy, high in heat resistance and serviceable with a minimum of oil lubrication.

It is another object of this invention to provide a method for manufacturing precision parts of a scroll compressor from said resin composition.

It is a still another object of this invention to provide scroll compressor parts as manufactured by the above-mentioned manufacturing method.

BRIEF DESCRIPTION OF THE DRAWINGS

FIG. 1 is a longitudinal sectional elevation view of a scroll compressor.

FIG. 2 is a sectional view of the same scroll compressor taken along the line I—I' of FIG. 1.

DESCRIPTION OF THE INVENTION

This invention provides a resin composition for scroll compressor parts which comprises per 100 parts of the composition (A) about 40 to 70 parts by weight of at least one thermoplastic resin selected from the group consisting of polyphenylene sulfide, polyetheretherketone, polyether ketone, all aromatic polyester, nylon-4,6, nylon-MXD6, polysulfone, polyarylsulfone, polyethersulfone, polyetherimide, polyamide-imide and polyimide;

(B) about 15 to 45 parts by weight of whiskers with an average fiber diameter of not more than about 3 μm and a tensile modulus of not less than about 10,000 kgf/mm$^2$;

(C) about 10 to 25 parts by weight of heat-resistant fiber with an average fiber diameter of not more than about 30 μm and a tensile modulus of not less than about 6,500 kgf/mm$^2$; and (D) about 5 to 20 parts by weight of a finely-divided solid lubricant.

In another aspect, this invention provides a method for manufacturing scroll compressor parts which is characterized by injection-molding a resin composition comprising the above-mentioned components (A) to (D).

Furthermore, this invention provides scroll compressor parts as manufactured by the above manufacturing method.

The above resin composition of this invention, when injection-molded, provides scroll compressor parts which are lightweight, of high rigidity, with good dimensional accuracy and high creep- and heat-resistance, and serviceable with a minimum of oil lubrication. Moreover, with the resin composition of this invention, scroll compressor parts having necessary performance characteristics can be manufactured by the advantageous high-production technique of injection molding without after-processing. The scroll compressor parts thus manufactured are excellent in dimensional accuracy and surface smoothness, for instance, and can therefore be used directly as orbiting scrolls, fixed scrolls or other parts without necessitating any cutting operation. Particularly the mirror surface of the mirror plate which is contacted by the scroll lap is very smooth because of the good mold transferability due to the incorporation of whiskers and satisfactory in wear resistance because of the incorporation of said finely divided solid lubricant.

Particularly in accordance with this invention, injection-molding of the above resin composition provides scroll compressor parts having excellent properties such as an ASTM D792 specific gravity of about 1.3 to 2.5, an ASTM D648 deflexion temperature (under a flexural load of 18.6 kgf/cm$^2$) of not less than 180° C., an ASTM D790 flexural modulus of not less than 800 kgf/mm², a surface roughness of not more than 5s, and a dynamic friction coefficient of not more than 0.25.

As manufactured in accordance with this invention, the scroll lap and the surface of the mirror plate contacted thereby are so smooth and high in lubricity and wear resistance as mentioned above that the hitherto required embedding of chip seal can now be dispensed with, facilitating assemblage of the scroll compressor. Furthermore, when the compressor part according to this invention is a drive shaft, it has the advantage of a reduced level of gyration sound (noise). In addition, since the scroll compressor part according to this invention is made of resin, it is not rusted and because the very material is highly slidable and resistant to wear, t is very durable, thus being able to replace the corresponding metal part.

The thermoplastic resin used as component (A) in accordance with this invention can be any member of a variety of resins only if it is such that when reinforced by specified amounts of component (B) whisker, component (C) heat-resistant fiber and component (D) finely divided solid lubricant to be described hereinafter, it provides a resin molded product having a deflexion temperature (under a load of 18.6 kgf/cm²) of not less than 180° C. As such thermoplastic resins, polyphenylene sulfide, polyetheretherketone, polyetherketone, all-aromatic polyester, nylon-4,6, nylon-MXD6, polysulfone, polyarylsulfone, polyethersulfone, polyetherimide, polyamide-imide, polyimide, etc. can be employed and these resins may be used singly or in combination.

The polyphenylene sulfide mentioned above is a resin having a repeating unit of the general formula

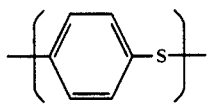
(1)

The polyetheretherketone is a resin having a repeating unit of the general formula

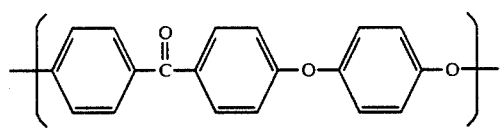
(2)

The polyetherketone is a resin having a repeating unit of the general formula

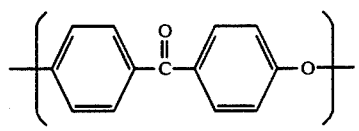
(3)

The all-aromatic polyester may for example be a polycondensate of mixed terephthaloyl-isophthaloyl chloride with bisphenol A, which is commercially available under the tradename of U Polymer (manufactured by Unitika Ltd.), for instance, or a thermotropic liquid crystal polyester containing p-hydroxybenzoic acid. As examples of the latter, there may be mentioned the polycondensate of p-hydroxybenzoic acid, 6-hydroxy-2-naphthalenecarboxylic acid and terephthalic acid, which is commercially available under the tradename of Vektra (manufactured by Hoechst-Celanese), for instance, and the polycondensate of p-hydroxybenzoic acid, 4,4'-biphenol and terephthalic acid, which is commercially available under the tradename of Ekonol (manufactured by Sumitomo Chemical Industries, Ltd.) or Xydar (manufactured by Dartco Manufacturing), for instance. Nylon-4,6 is a resin having a repeating unit of the general formula

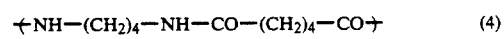
(4)

which is available under the tradename of Stanyl (manufactured by DSM).

Nylon-MXD6 is a resin which, for example, has a repeating unit of the general formula

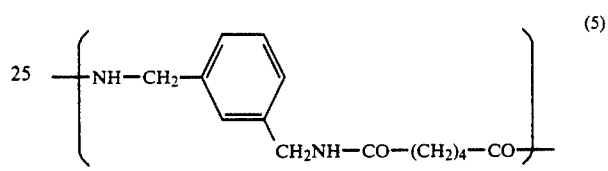
(5)

which is available under the tradename Of RENY (manufactured by Mitsubishi Gas Chemical), for instance. The polysulfone is exemplified by a resin having a repeating unit of the general formula

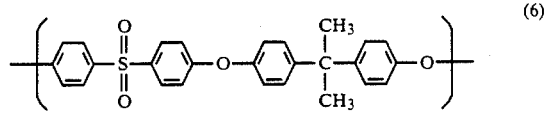
(6)

which is available under the tradename of UDEL (manufactured by UCC), for instance. The polyarylsulfone may for example be a resin having a repeating unit of the general formula

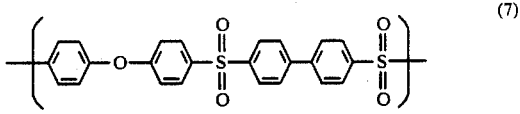
(7)

which is commercially available under the tradename of RADEL (manufactured by Carborandum), for instance. The polyethersulfone may for example be a resin containing a repeating unit of the general formula

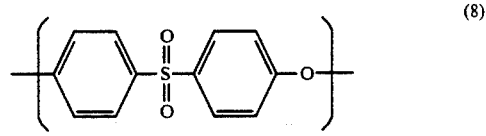
(8)

which is available under the tradename of VICTREX PES (manufactured by ICI), for instance. The polyetherimide may for example be a resin having a repeating unit of the general formula

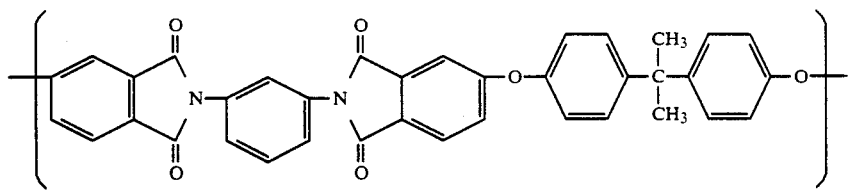

which is commercially available under the tradename of ULTEM (manufactured by GE), for instance. The polyamide-imide may for example be a resin having a repeating unit of the general formula

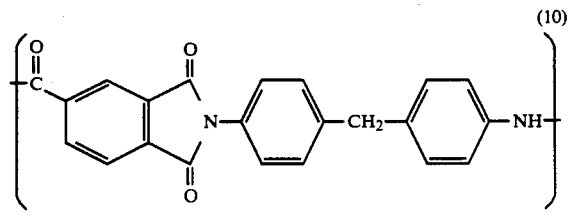

which is available under the tradename of Torlon (manufactured by Amoco), for instance. The polyimide may for example be a resin containing a repeating unit of the general formula

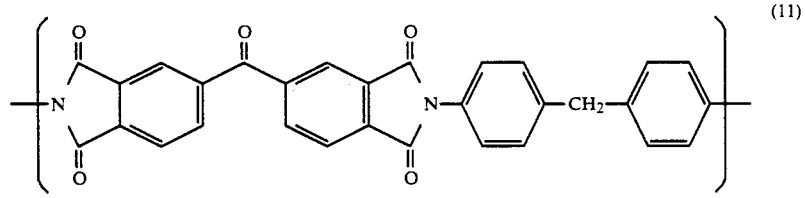

and a repeating unit of the general formula

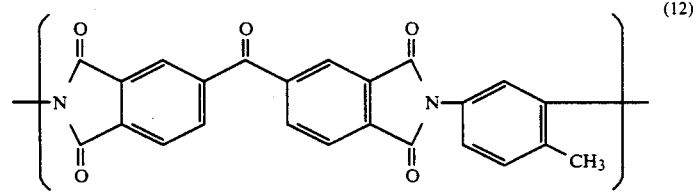

which is commercially available under the tradename of Polyimide 2080 (manufactured by Upjohn), for instance.

If the thermoplastic resin is such that, when compounded and reinforced with specified amounts of component (B) whisker, component (C) heat-resistant fiber and component (D) finely divided solid lubricant, it provides a resin composition with a deflexion temperature of less than 180° C., the heat resistance of the resin composition will be so undesirably poor that the composition tends to be unable to withstand the heat which is generated, for instance, by the friction between the scroll laps under the pressure of, say, freon gas, the friction between the orbiting scroll and the drive shaft and the friction between the drive shaft and the bearing.

In this invention, the above-mentioned component (A) thermoplastic resin is preferably one belonging to the category of heat-resistant engineering plastics which has (i) a deflexion temperature (ASTM D648, 1.86 MPa) of not less than 150° C. and (ii) an UL temperature index (UL746) of not less than 120° C. In this invention, the polyphenylene sulfide, polyetheretherketone, all-aromatic (thermotropic liquid crystal) polyester, polyethersulfone and polyetherimide which have the above properties can be used with particular advantage in terms of moldability, dimensional stability, mechanical properties and freon resistance.

The component (B) whisker to be employed in this invention may be any of various whiskers having an average fiber diameter of not more than about 3 $\mu$m, particularly about 0.1 to 3 $\mu$m, and preferably about 0.1 to 2 $\mu$m and a tensile modulus of not less than about 10,000 kgf/mm$^2$. In this invention, the potassium titanate whisker, silicon carbide whisker, carbon graphite whisker, silicon nitride whisker, $\alpha$-alumina whisker etc. which have the average fiber diameter and tensile modulus specified hereinbefore can be used singly or in combination. Incorporation of the above whisker not only results in improvements in dimensional accuracy and surface smoothness of scroll compressor parts but also results in interfilament reinforcement of component (C) heat-resistant fiber and a uniform filling thereof into the resin matrix. If the average fiber diameter of the whisker used exceeds 3 $\mu$m, the surface smoothness and other properties of scroll compressor parts will be undesirably sacrificed. If the whisker has a tensile modulus below 10,000 kgf/mm$^2$, it tends to become undesirably difficult to achieve a rigidity comparable to that of metal by the addition of whisker to the resin composition. The length of component (B) whisker can be selected generally from the range of 1 to 1,000 $\mu$m and typically from the range of 10 to 200 $\mu$m.

The component (C) heat-resistant fiber to be used in this invention may be any of various heat-resistant fibers having an average fiber diameter of not more than about 30 $\mu$m, particularly about 0.5 to 30 $\mu$m, and preferably about 0.5 to 20 $\mu$m and a tensile modulus of not less than about 6,500 kgf/mm². In this invention, as representative examples of such heat-resistant fiber, there may be mentioned the carbon fiber, alumina fiber, zirconia fiber, silicon carbide fiber, silica fiber, glass fiber, aromatic polyamide fiber such as ARMID, etc. which have the above-specified average fiber diameter and tensile modulus and these fibers can be used singly or in combination. The use of such heat-resistant fiber helps improve the strength, rigidity, impact resistance, deformation resistance (thermal deformation, creep characteristic), etc. of the scroll compressor parts molded from the composition of this invention. If the average fiber diameter of the heat-resistant fiber exceeds 30 μm, it tends to become difficult to control the surface roughness below 5s, the level necessary for scroll compressor parts, even with the aid of said whisker. If the tensile modulus is below 6,5000 kgf/mm², the tendency arises that the flexural modulus of the parts obtained by the injection molding of the scroll compressor part resin composition of this invention is hard to attain a minimum of 800 kgf/mm² which is necessary for the parts to substitute the metal counterparts. Particularly beneficial are the alumina fiber, silicon carbide fiber and carbon fiber with a tensile moduls of not less than about 15,000 kgf/mm² and preferably not less than about 20,000 kgf/mm², and of these fibers, the high-strength or high-modulus carbon fiber of the PAN type is the most desirable. However, for the production of pellets of the composition of this invention which is described hereinafter and in terms of injection moldability, these heat-resistant fibers are preferably used in the form of cut fibers with a fiber length of about 0.5 to 6 mm.

The component (D) finely divided solid lubricant to be used in this invention may be any of various lubricants, for example at least one member selected from the group consisting of polytetrafluoroethylene (particularly one with an average molecular weight of about a few thousand to 300 thousand), high-density polyethylene (particularly one with a density of about 0.945 to 0.970 and a viscosity average molecular weight of about 10 thousand to 400 thousand), ultra-high molecular weight polyethylene (particularly one with a viscosity average molecular weight of about 500 thousand to 5 million), all-aromatic polyamide powder such as polyphenyleneisophthalamide, ultramicrofine phenol resin (particularly one with a bulk density of 0.3 to 0.8 g/cc; tradename "Bellpearl", product of Kanebo, Inc.), and its graphitizate (for example, Bellpearl C-600, product of Kanebo, Inc.), graphite, molybdenum disulfide, tungsten disulfide, $WSe_2MoSe_2$ and boron nitride. The average particle diameter of these lubricants is not more than 100 μm, particularly about 0.5 to 100 μm and preferably about 1 to 30 μm. The incorporation of such a finely divided solid lubricant remarkably improves the wear resistance of scroll compressor parts. The use of a finely divided solid lubricant with an average particle diameter in excess of 100 μm would tend to adversely affect the surface smoothness of scroll compressor parts.

In the practice of this invention, it is important that the above-mentioned components be compounded in the proportions indicated below.

Thus, the proportion of the thermoplastic resin constituting said component (A) is about 40 to 70 parts and preferably about 45 to 63 parts per 100 parts of the composition of this invention. (All parts are by weight; the same applies hereinafter.) If the proportion of the thermoplastic resin is less than 40 parts, the resulting resin composition will suffer from disadvantages in regard to injection moldability and the injection-molded scroll compressor parts will tend to become undesirably brittle. On the other hand, if the proportion of the thermoplastic resin exceeds 70 parts, the flexural modulus of parts molded from the resulting resin composition will not reach 800 kgf/mm² and the parts may undesirably deform at a high pressure, for example, of freon gas. Such parts are only usable for compressors operated with a small amount of refrigerant.

The whisker constituting said component (B) is incorporated in a proportion of about 15 to 45 parts and preferably about 20 to 35 parts per 100 parts of the composition of this invention. If the proportion of whisker is less than 15 parts, the beneficial effect of addition of whisker (especially improvements in surface smoothness and dimensional accuracy) will tend to be scarcely developed. The use of whisker in a proportion of more than 45 parts results in a relative decrease in the amount of thermoplastic resin, heat-resistant fiber and finely divided solid lubricant, so that the desired effects of the invention may not be achieved.

The heat-resistant fiber constituting said component (C) is used in a proportion of about 10 to 25 parts and preferably about 10 to 20 parts per 100 parts of the composition of this invention. If the proportion of heat-resistant fiber is less than 10 parts, the desired effect of addition of heat-resistant fiber (particularly, improved impact resistance) may hardly come by. If the proportion of heat-resistant fiber exceeds 25 parts, it will become difficult to control the surface roughness below 5s which is required for the sliding surfaces of scroll compressor parts.

The finely divided solid lubricant constituting said component (D) is used in a proportion of about 5 to 20 parts and preferably about 7 to 15 parts per 100 parts of the composition of this invention. If the proportion of finely divided solid lubricant is less than 5 parts, the effect of addition of such finely divided solid lubricant may undesirably be scarcely realized. On the contrary, if the proportion of solid lubricant exceeds 20 parts, the undesirable tendency will arise that the strength of scroll compressor parts is drastically reduced.

In the resin composition of this invention, within the range that its fundamental physical characteristics, moldability, etc. are not adversely affected, said whisker or heat-resistant fiber may be partially replaced with inorganic fillers such as talc, mica, silica, etc. or, for increasing the surface hardness, with metal whiskers and/or powders of metals such as brass, zinc, and so on. Depending on cases, it is also possible to incorporate carbon black, colorants such as inorganic or organic pigments, heat stabilizers and so on.

For the production of the resin composition of this invention, there may be employed, for example, the method which comprises weighing the necessary amounts of said thermoplastic resin, whisker, heat-resistant fiber and finely divided solid lubricant, blending them evenly in a blender such as a tumbler mixer, kneading the same in a melt kneader such as an extrusion machine and pelletting the same to provide the composition in the form of pellets.

The specific gravity of the resin composition of this invention is usually in the range of 1.3 to 2.0. However, when high-specific-gravity alumina whisker, zirconia fiber, metal whisker or metal powder is used concomitantly, the specific gravity may be as high as 2.5 at the maximum.

Scroll compressor parts can be manufactured by injection-molding the above resin composition. For example, a metal mold for the desired scroll compressor part (one cavity metal mold for the orbiting scroll, fixed scroll or drive shaft) is set on a precision injection molding machine and the machine is set to the predetermined values of cylinder temperature, mold temperature, injection pressure and injection time, suitable for molding the thermoplastic resin used. Then, the machine is started to manufacture the desired part.

In the manufacture of scroll compressor parts according to this invention, it is possible to employ a metal insert such as one made of cast aluminum, cast iron or the like for imparting added rigidity to the scroll lap or drive shaft.

EXAMPLES

This invention is described in further detail below by way of example. It should be understood that the examples given are merely illustrative of the invention and should by no means be construed to be limitative of the scope of the invention. The component (A) thermoplastic resins used in the examples and comparative examples are invariably those having a deflexion temperature (ASTM D648, 1.86 MPa) of not less than 150° C. and an UL temperature index (UL746) of not less than 120° C.

EXAMPLES 1 TO 4 AND COMPARATIVE EXAMPLES 1 AND 2

Using a blender, the respective components were blended in the proportions (parts by weight) indicated in Table 1. The resulting compound was melt-kneaded in a 45 mm extruder at a cylinder temperature of 300° C. and pelletted with a cutter. Using the resulting pellets, a fixed scroll and an orbiting scroll were respectively injection-molded at a cylinder temperature of 320° C., a mold temperature of 120° C., an injection pressure (primary pressure) of 1,200 kgf/cm$^2$ and a hold pressure (secondary pressure) of 650 kgf/cm$^2$.

To examine the fundamental physical properties of the same material, the following specimens were prepared using the ASTM mold for test specimens under the same conditions as above and each specimen was allowed to stand in a constant temperature-humidity chamber maintained at 20° C. and 50% RH for 24 hours and evaluated for the following physical properties. The results are given below in Table 2.

Specific gravity: ASTM D792; measured using Izod impact test specimen.

Flexural modulus: ASTM D790; thickness 6.4 mm, width 12.7 mm, rate of crosshead motion 5 mm/min.

Deflexion temperature: ASTM D648; the same test specimen as above was subjected to the test under a load of 18.6 kgf/cm$^2$.

Sliding characteristic: Suzuki type frictional wear tester [EFM-III-EN, manufactured by Toyo Baldwin], thrust wear between parts of the same material (surface roughness, Ra=0.2–0.3 μm, Rz=1.0–2.5 μm), measuring load 3 kgf/cm$^2$, peripheral speed 30 cm/sec., distance of travel 10 Km.

Izod impact: ASTM D256; width 6.6 mm (¼ inches), thickness 12.7 mm, V notch after-processed.

Surface roughness: Using a surface roughness tester [Surfcom 304B, manufactured by Tokyo Seimitsu], the surface roughness of the mirror plate (the roughness of the metal mold=0.8s) of the orbiting scroll was determined with a measuring length of 2.5 mm in an optional position and the maximum height $R_{max}$ was recorded.

The respective components shown in Table 1 are as follows.

(A) Thermoplastic Resin

A-1: Polyphenylene sulfide resin (tradename RYTON R-6, manufactured by Phillips Petroleum; melt viscosity at 300+ C.=2000 poises)

(B) Whisker

B-1: Potassium titanate (tradename Tismo-D101; average fiber diameter 0.3 μm, tensile modulus 28,000 kgf/mm$^2$; manufactured by Otsuka Chemical Co., Ltd.)

B-2: α-Alumina whiskers (tradename Saffil; average fiber diameter 3 μm, tensile modulus 49,200 kgf/mm$^2$; manufactured by ICI)

(C) Heat-Resistant Fiber

C-1: Carbon fiber (tradename Besfight HTA-C6-NR, average fiber diameter 7 μm, tensile modulus 24,000 kgf/mm$^2$, fiber length 6 mm; manufactured by Toho Rayon)

C-2: Zirconia fiber (average fiber diameter 7 μm, tensile modulus 12,900 kgf/mm$^2$, specific gravity 5.6, fiber length 6 mm; manufactured by Hittman)

(D) Finely Divided Solid Lubricant

D-1: PTFE (tradename Fluon L150J; average particle diameter 9 μm; manufactured by Asahi Fluoropolymer)

D-2: MoS$_2$ (tradename Molypowder-B; average particle diameter 5.0 μm, manufactured by Nippon Graphite Industries)

D-3: All-aromatic polyamide (polyphenylene isophthalamide resin powder, average particle diameter 86 μm, (manufactured by Teijin Limited))

(E) Filling Agent

E-1: Brass powder

TABLE 1

| Component (parts by weight) | Example 1 | Example 2 | Example 3 | Example 4 | Comparative Example 1 | Comparative Example 2 |
|---|---|---|---|---|---|---|
| Thermoplastic resin | | | | | | |
| A-1 | 55 | 70 | 40 | 40 | 60 | 63 |
| Whisker | | | | | | |
| B-1 | 23 | 15 | 38 | — | 33 | — |
| B-2 | — | — | — | 19 | — | — |
| Heat-resistant fiber | | | | | | |
| C-1 | 15 | 10 | 10 | — | — | 30 |
| C-2 | — | — | — | 18 | — | — |
| Finely divided solid lubricant | | | | | | |
| D-1 | 7 | 5 | 10 | 6 | 7 | 7 |
| D-2 | — | — | 2 | — | — | — |
| D-3 | — | — | — | 2 | — | — |
| Filling agent | | | | | | |
| E-1 | — | — | — | 15 | — | — |

TABLE 2

| Characteristics of material | Example 1 | Example 2 | Example 3 | Example 4 | Comparative Example 1 | Comparative Example 2 |
|---|---|---|---|---|---|---|
| Specific gravity | 1.67 | 1.54 | 1.91 | 2.24 | 1.72 | 1.49 |
| Flexural modulus (kgf/mm$^2$) | 1680 | 980 | 1820 | 1760 | 1410 | 1450 |
| Deflexion temperature (°C.) | 253 | 216 | 249 | 254 | 238 | 260 |
| Sliding characteristics | | | | | | |
| Coefficient of dynamic friction | 0.16 | 0.21 | 0.15 | 0.20 | 0.33 | 0.25 |

TABLE 2-continued

| Characteristics of material | Example | | | | Comparative Example | |
|---|---|---|---|---|---|---|
| | 1 | 2 | 3 | 4 | 1 | 2 |
| Specific wear (mm³/kgf · km) | 0.008 | 0.016 | 0.005 | 0.004 | 0.278 | 0.015 |
| Izod impact (kgf · cm/cm) | 3.3 | 2.9 | 2.6 | 2.7 | 1.6 | 4.1 |
| Surface roughness | 2.8s | 2.1s | 1.6s | 4.6s | 1.2s | 11.2s |

The following is obvious from Tables 1 and 2. Thus, Comparative Example 1, which does not contain heat-resistant fiber, is not sufficient in wear resistance (large specific wear) and impact resistance. Furthermore, when these parts were subjected to a field test, the scroll lap was chipped and the amount of wear was large. In Comparative Example 2 wherein Whisker was not used, it is evident from the surface roughness data that no mirror surface can be obtained. Moreover, when these parts were subjected to a field test, the compression efficiency was poor compared with the use of parts with less surface roughness.

On the other hand, in Examples 1 to 4 wherein both the whisker and heat-resistant fiber were used, the specific gravity was in the range of 1.3 to 2.5 and the other characteristics were also satisfactory for practical application with a flexural modulus of not less than 800 kgf/mm², a deflexion temperature of not less than 180° C., a coefficient of dynamic friction, which is representative of sliding characteristic, of not more than 0.25, and a specific wear, representative of wear resistance, of not more than 0.05 mm³/kgf.km, and an impact resistance of not less than 2.5 kgf.cm/cm. The surface roughness was also not more than 5.0s and, therefore, mere injection-molding of this resin composition (without machining) provides a mirror surface. The field test using an assembled scroll compressor also demonstrated that these parts were fully serviceable.

An example of the scroll compressor assembled using the fixed and orbiting scrolls molded from the resin composition of this invention is shown in FIGS. 1 and 2.

FIG. 1 is a longitudinal sectional elevation view showing the above scroll compressor and FIG. 2 is a sectional view of the same scroll compressor as taken along the line I—I' of FIG. 1.

In FIGS. 1 and 2, the parts or members represented by respective numerals are as follows.

1: Fixed scroll
 (1a: mirror plate, 1b: scroll lap)
2: Orbiting scroll
 (2a: mirror plate, 2b: scroll lap)
3 and 3': Drive shaft
4: Balance weight
5 and 5': Bearing
6: Eccentric oiling port
7: Frame
8: Oldham coupling (anti-spinning mechanism)
9: Suction line
10: Discharge port
11: Intermediate pressure chamber
12: Closed housing
13: Motor
14: Lubricating oil
15: Discharge line
16: Gas pocket In the scroll compressor shown in FIGS. 1 and 2, a fixed scroll (1) having a mirror plate (1a) and a scroll lap (1b) perpendicular to said mirror plate and an orbiting scroll (2) having a mirror plate (2a) and a fixed scroll lap (2b) perpendicular to said mirror plate were manufactured by injection-molding of the composition of this invention. As a drive shaft (3) is driven by an electric motor (13), a shaft (3') in contact with, for example, an oil-impregnated sintered metal bearing (5') of the orbiting scroll (2) causes the orbiting scroll (2) to undergo gyration. As a result, a space (16) defined by respective laps (2b) and (1b) and mirror plates (2a) and (1a) of the orbiting scroll (2) and fixed scroll (1) is reduced in volume towards the center. Therefore, the gas introduced from a suction line (9) is compressed and discharged from a discharge port (10) while the gas in a top space (20) within a closed housing (12) flows to a bottom space (24) through a passageway (22) and is exhausted from the closed housing (12) via a discharge line (15).

EXAMPLE 5

Using the resin composition of Example 1 and, as an insert, an iron core (FC25), a drive shaft for the orbiting scroll was injection-molded. This drive shaft was a part such as the member indicated by reference numeral (3) or (3') in FIG. 1.

The resulting drive shaft was very satisfactory in surface smoothness and dimensional accuracy and, as found by a field trial, was also satisfactory in wear resistance. Compared with the conventional metallic drive shaft, it was operable without oil lubrication in the case where an internally lubricated sintered metal bearing is used. Moreover, it was found that when the shaft was driven with a motor at 50 Hz and 130–180 V, the noise was lower by 2 to 5 dB.

EXAMPLES 6 to 10

Resin compositions (pellets) were prepared in the same manner as Examples 1 to 4 except that the respective components shown below in Table 3 were used in the amounts (parts by weight) indicated in Table 3. The respective compositions were injection-molded into fixed scroll and ASTM specimens, which were then evaluated as described hereinbefore. The results are shown in Table 4.

The respective components shown in Table 3 were as follows.

(A) Thermoplastic Resin

A-2: Polyetheretherketone (tradename Victrex PEEK 450G; manufactured by ICI)

A-3: All-aromatic polyester (tradename Vektra-A950; manufactured by Celanese)

A-4: Nylon-4,6 (tradename Stanyl; manufactured by DSM)

A-5: Polyethersulfone (tradename Victrex PES 4100G; manufactured by ICI)

A-6: Polyetherimide (tradename Ultem #1010; manufactured by GE)

(B) Whiskers

B-3: SiC whiskers (tradename Tokamax; average fiber diameter 0.5 μm, tensile modulus 41,000 kgf/mm²; manufactured by Tokai Carbon)

B-4: $Si_3N_4$ whisker average fiber diameter 0.5 μm, tensile modulus 38,700 kgf/mm²; manufactured by Tateho Chemical)

(C) Heat-Resistant Fiber

C-3: SiC fiber (tradename Nikalon; average fiber diameter 12 μm, tensile modulus 20,000 kgf/mm², fiber length 3 mm, manufactured by Nippon Carbon)

C-4: Glass fiber (tradename ECS-03-T24; average fiber diameter 10 μm, tensile modulus 7,700 kgf/mm², fiber length 3 mm; manufactured by Nippon Electric Glass)

C-5: Aramid fiber (tradename Technora T-320; average fiber diameter 12 μm, tensile modulus 7,100 kgf/mm², fiber length 3 mm, manufactured by Teijin Limited)

C-6: Alumina fiber (spinel-form, $Al_2O_3/SiO_2=85/15$, average fiber diameter 9 μm, tensile modulus 25,000 kgf/mm², fiber length 3 mm; manufactured by Sumitomo Chemical)

(D) Finely Divided Solid Lubricant

D-4: BN (tradename Sho-BN UHP; average particle diameter 2 μm; manufactured by Showa Denko)

D-5: Ultra-high molecular weight polyethylene [tradename Hizex Million microfine powder; average particle diameter 50 μm, average molecular weight 3 million; manufactured by Mitsui Petrochemical Industries)

D-6: High density polyethylene (tradename Hizex 5000; average particle diameter 30 μm, average molecular weight 70 thousand; manufactured by Mitsui Petrochemical Industries)

D-7: Graphite (tradename ACP-1000; average particle diameter 6 μm, fixed carbon 99.5%; manufactured by Nippon Graphite Industries)

TABLE 3

| Component (parts by weight) | Example 6 | 7 | 8 | 9 | 10 |
| --- | --- | --- | --- | --- | --- |
| A-2 | 60 | — | — | — | — |
| A-3 | — | 50 | — | — | — |
| A-4 | — | — | 60 | — | — |
| A-5 | — | — | — | 60 | — |
| A-6 | — | — | — | — | 63 |
| B-1 | — | 30 | 25 | — | 20 |
| B-3 | 20 | — | — | — | — |
| B-4 | — | — | — | 20 | — |
| C-1 | 10 | — | — | 10 | — |
| C-3 | — | 13 | — | — | — |
| C-4 | — | — | 10 | — | — |
| C-5 | — | — | — | 3 | — |
| C-6 | — | — | — | — | 10 |
| D-1 | 7 | — | — | 7 | — |
| D-4 | 3 | — | — | — | — |
| D-5 | — | 7 | — | — | — |
| D-6 | — | — | 5 | — | 4 |
| D-7 | — | — | — | — | 3 |

TABLE 4

| Characteristics of material | Example 6 | 7 | 8 | 9 | 10 |
| --- | --- | --- | --- | --- | --- |
| Specific gravity | 1.60 | 1.72 | 1.48 | 1.64 | 1.53 |
| Flexural modulus (kgf/mm²) | 1350 | 1890 | 830 | 1230 | 970 |
| Deflexion temperature (°C.) | >260 | 252 | >260 | 212 | 210 |
| Sliding characteristics | | | | | |
| Coefficient of dynamic friction | 0.18 | 0.22 | 0.19 | 0.18 | 0.18 |
| Specific wear (mm³/kgf · km) | 0.005 | 0.023 | 0.003 | 0.038 | 0.042 |
| Izod impact (kgf · cm/cm) | 4.5 | 2.7 | 6.3 | 3.7 | 3.2 |
| Surface roughness | 3.2s | 4.7s | 3.4s | 4.5s | 3.8s |

It will be apparent from Table 4 that the scroll compressor parts injection-molded from the resin composition of this invention have a specific gravity in the range of 1.3 to 2.5, a flexural modulus of not less than 800 kgf/mm², a deflexion temperature of not less than 180° C., a sliding characteristic, in terms of coefficient of dynamic friction, of not more than 0.25, a wear resistance, in terms of specific wear, of not more than 0.05 mm³/kgf.km, an impact resistance of not less than 2.5 kgf.cm/cm and a surface roughness of not more than 5.0s, thus being sufficiently capable of replacing metallic parts.

I claim:

1. A resin composition for scroll compressor parts which consists essentially of
   (A) about 40 to 63 parts by weight of at least one thermoplastic resin selected from the group consisting of polyphenylene sulfide, polyetheretherketone, polyetherketone, all-aromatic polyester, nylon-4,6, nylon-MXD6, polysulfone, polyarylsulfone, polyethersulfone, polyetherimide, polyamide-imide and polyimide;
   (B) about 15 to 45 parts weight of whisker with an average diameter of not more than about 3 μm and a tensile modulus of not less than about 10,000 kgf/mm², said whisker being at least one selected from the group consisting of potassium titanate whisker, silicon carbide whisker, carbon graphite whisker, silicon nitride whisker and α-alumina whisker;
   (C) about 10 to 25 parts by weight of heat-resistant fiber with an average fiber diameter of not more than about 30 μm and a tensile modulus of not less than about 6,500 kgf/mm²; and
   (D) about 5 to 20 parts by weight of a finely divided solid lubricant, said finely divided solid lubricant being at least one selected from the group consisting of polytetrafluoroethylene, ultra-high molecular weight polyethylene, all-aromatic polyamide, microfine phenolic resin, molybdenum disulfide, tungsten disulfide, $WSe_2$, $MoSe_2$ and boron nitride, the sum total of components (A) to (D) being 100 parts by weight.

2. The composition of claim 1 wherein said thermoplastic resin has a deflexion temperature (ASTM D648, 1. 86MPa) of not less than 150° C. and an UL temperature index (UL746) of not less than 120° C.

3. The composition of claim 1 wherein said thermoplastic resin is polyphenylene sulfide, polyetheretherketone, all-aromatic (thermotropic liquid crystal) polyester, polyethersulfone or polyether imide.

4. The composition of claim 1 wherein said thermoplastic resin is used in an amount of about 45 to 63 parts per 100 parts by weight of the composition.

5. The composition of claim 1 wherein said whisker is at least one member selected from the group consisting of potassium titanate whisker, silicon carbide whisker, carbon graphite whisker, silicon nitride whisker and α-alumina whisker, which has an average fiber diameter of about 0.1 to 3 μm and a tensile modulus of not less than about 10,000 kfg/mm².

6. The composition of claim 1 wherein said whisker is used in an amount of about 20 to 35 parts by weight per 100 parts by weight of the composition.

7. The composition of claim 1 wherein said heat-resistant fiber is at least one member selected from the group consisting of carbon fiber, alumina fiber, zirconia fiber, silicon carbide fiber, silica fiber, glass fiber and aromatic polyamide fiber, which has an average fiber diameter of about 0.5 to 30 μm, an average fiber length of about 0.5 to 6 mm, and a tensile modulus of not less than about 6,500 kgf/mm².

8. The composition of claim 7 wherein said heat-resistant fiber is alumina fiber, silicon carbide fiber or carbon fiber, which has a tensile modulus of not less than 15,000 kgf/mm².

9. The composition of claim 1 wherein said heat-resistant fiber is used in an amount of about 10 to 20 parts by weight per 100 parts by weight of the composition.

10. The composition of claim 1 wherein said finely divided solid lubricant has an average particle diameter of about 0.5 to 100 μm.

11. The composition of claim 1 wherein said finely divided solid lubricant is used in an amount of about 7 to 15 parts by weight per 100 parts by weight of the composition.

12. The composition of claim 1, wherein said whisker has a diameter in the range of about 0.1 μm to about 3 μm, and said fiber has a diameter in the range of about 0.5 μm to about 30 μm.

13. A method of manufacturing scroll compressor parts comprising the step of injection-molding a resin composition for scroll compressor parts which consists essentially of
   (A) about 40 to 63 parts by weight of at least one thermoplastic resin selected from the group consisting of polyphenylene sulfide, polyetheretherketone, polyetherketone, all-aromatic polyester, nylon-4,6, nylon-MXD6, polysulfone, polyarylsulfone, polyethersulfone, polyetherimide, polyamide-imide and polyimide;
   (B) about 15 to 45 parts by weight of whisker with an average diameter of not more than about 3 μm and a tensile modulus of not less than about 10,000 kgf/mm², said whisker being at least one selected from the group consisting of potassium titanate whisker, silicon carbide whisker, carbon graphite whisker, silicon nitride whisker and α-alumina whisker;
   (C) about 10 to 25 parts by weight of heat-resistant fiber with an average fiber diameter of not more than about 30 μm and a tensile modulus of not less than about 6,500 kgf/mm²; and
   (D) about 5 to 20 parts by weight of a finely divided solid lubricant, said finely divided solid lubricant being at least one selected form the group consisting of polytetrafluoroethylene, ultra-high molecular weight polyethylene, all-aromatic polyamide, microfine phenolic resin, molybdenum disulfide, tungsten disulfide, $WSe_2$, $MoSe_2$ and boron nitride, the sum total of components (A) to (D) being 100 parts by weight.

14. The method of claim 13 wherein injecting molding is carried out using an insert of metallic material which is capable of imparting rigidity to the resulting scroll compressor parts.

15. The method of claim 13, wherein said whisker has a diameter in the range of about 0.1 μm to about 3 μm, and said fiber has a diameter in the range of about 0.5 μm to about 30 μm.

16. A scroll compressor part, which is a fixed scroll, an orbiting scroll, a drive shaft or an Oldham coupling, manufactured by the method of claim 13.

17. The scroll compressor part of claim 16, wherein said whisker has a diameter in the range of about 0.1 μm to about 3 μm, and said fiber has a diameter in the range of about 0.5 μm to about 30 μm.

* * * * *